US008321467B2

(12) United States Patent
Mangan

(10) Patent No.: US 8,321,467 B2
(45) Date of Patent: *Nov. 27, 2012

(54) SYSTEM AND METHOD FOR COMMUNICATING BETWEEN AN APPLICATION AND A DATABASE

(75) Inventor: John Patrick Mangan, Surrey (GB)

(73) Assignee: JP Morgan Chase Bank, New York, NY (US)

( * ) Notice: Subject to any disclaimer, the term of this patent is extended or adjusted under 35 U.S.C. 154(b) by 979 days.

This patent is subject to a terminal disclaimer.

(21) Appl. No.: 11/609,172

(22) Filed: Dec. 11, 2006

(65) Prior Publication Data

US 2007/0143337 A1 Jun. 21, 2007

Related U.S. Application Data

(63) Continuation of application No. 10/308,792, filed on Dec. 3, 2002, now Pat. No. 7,149,752.

(51) Int. Cl.
*G06F 7/00* (2006.01)
*G06F 17/30* (2006.01)
(52) U.S. Cl. ........................................ 707/802; 707/792
(58) Field of Classification Search .................. 707/2–4, 707/999.2, 802
See application file for complete search history.

(56) References Cited

U.S. PATENT DOCUMENTS

| | | | |
|---|---|---|---|
| 4,445,173 A * | 4/1984 | Pilat et al. | 712/228 |
| 4,751,702 A | 6/1988 | Beier et al. | |
| 5,027,269 A | 6/1991 | Grant et al. | |
| 5,159,687 A | 10/1992 | Richburg | |
| 5,301,320 A | 4/1994 | McAtee et al. | |
| 5,325,527 A | 6/1994 | Cwikowski et al. | |
| 5,499,371 A | 3/1996 | Henninger et al. | |
| 5,539,885 A | 7/1996 | Ono et al. | |
| 5,553,235 A | 9/1996 | Chen et al. | |
| 5,566,297 A | 10/1996 | Devarakonda et al. | |
| 5,594,863 A | 1/1997 | Stiles | |
| 5,630,047 A | 5/1997 | Wang | |
| 5,630,173 A | 5/1997 | Oprescu | |

(Continued)

FOREIGN PATENT DOCUMENTS

WO 01/35209 5/2001

(Continued)

OTHER PUBLICATIONS

Thomas; Enterprise Javabeans(TM) Technology: Server Component Model for the Java(TM) Platform, java.sun.com, May 2, 1999.

(Continued)

*Primary Examiner* — Etienne Leroux
*Assistant Examiner* — Mohammad Rahman
(74) *Attorney, Agent, or Firm* — Lowenstein Sandler PC

(57) ABSTRACT

A method for communicating between an application and a database by using a lightweight stored procedure data-binding framework for applications written in object oriented programming languages such as JAVA, significantly reduces the coding effort required to communicate with a relational database. Once the developer specifies the needed tabular data, the inventive framework generates all needed data objects and stored procedures to accomplish the interaction with that database data. The automatically generated code is then used by the application via a run-time component. This means the developer need only make simple calls in a few lines of code for database interaction. The encapsulated data model deals only with persistence and retrieval issues and is therefore de-coupled from the business model.

17 Claims, 3 Drawing Sheets

U.S. PATENT DOCUMENTS

| | | | |
|---|---|---|---|
| 5,673,403 A | 9/1997 | Brown et al. | |
| 5,689,698 A | 11/1997 | Jones et al. | |
| 5,692,181 A | 11/1997 | Anand et al. | |
| 5,712,971 A | 1/1998 | Stanfill et al. | |
| 5,717,925 A | 2/1998 | Harper et al. | |
| 5,732,262 A | 3/1998 | Gillespie et al. | |
| 5,734,887 A | 3/1998 | Kingberg et al. | |
| 5,737,592 A | 4/1998 | Nguyen et al. | |
| 5,761,499 A | 6/1998 | Sonderegger | |
| 5,768,119 A | 6/1998 | Havekost et al. | |
| 5,784,557 A | 7/1998 | Oprescu | |
| 5,790,809 A | 8/1998 | Holmes | |
| 5,801,689 A | 9/1998 | Huntsman | |
| 5,802,367 A | 9/1998 | Held et al. | |
| 5,806,075 A | 9/1998 | Jain et al. | |
| 5,815,415 A | 9/1998 | Bentley et al. | |
| 5,845,292 A | 12/1998 | Bohannon et al. | |
| 5,889,992 A | 3/1999 | Koerber | |
| 5,899,990 A | 5/1999 | Maritzen et al. | |
| 5,926,637 A | 7/1999 | Cline et al. | |
| 5,930,768 A | 7/1999 | Hooban | |
| 5,937,198 A | 8/1999 | Nelson et al. | |
| 5,937,402 A | 8/1999 | Pandit | |
| 5,946,458 A | 8/1999 | Austin et al. | |
| 5,949,412 A | 9/1999 | Huntsman | |
| 5,960,200 A | 9/1999 | Eager et al. | |
| 5,960,445 A | 9/1999 | Tamori et al. | |
| 5,987,247 A | 11/1999 | Lau | |
| 5,999,179 A | 12/1999 | Kekic et al. | |
| 6,003,075 A | 12/1999 | Arendt et al. | |
| 6,009,274 A | 12/1999 | Fletcher et al. | |
| 6,009,405 A | 12/1999 | Leymann et al. | |
| 6,011,916 A | 1/2000 | Moore et al. | |
| 6,046,742 A | 4/2000 | Chari | |
| 6,052,456 A | 4/2000 | Huang | |
| 6,065,009 A | 5/2000 | Leymann et al. | |
| 6,083,276 A | 7/2000 | Davidson et al. | |
| 6,101,489 A | 8/2000 | Lannert et al. | |
| 6,101,601 A | 8/2000 | Matthews et al. | |
| 6,108,698 A | 8/2000 | Tenev et al. | |
| 6,148,296 A | 11/2000 | Tabbara | |
| 6,163,776 A * | 12/2000 | Periwal | 707/4 |
| 6,173,439 B1 | 1/2001 | Carlson et al. | |
| 6,178,409 B1 | 1/2001 | Weber et al. | |
| 6,184,996 B1 | 2/2001 | Gase | |
| 6,185,613 B1 | 2/2001 | Lawson et al. | |
| 6,195,676 B1 | 2/2001 | Spix et al. | |
| 6,226,684 B1 | 5/2001 | Sung et al. | |
| 6,230,319 B1 | 5/2001 | Britt, Jr. et al. | |
| 6,246,410 B1 | 6/2001 | Bergeron et al. | |
| 6,249,877 B1 | 6/2001 | Kawakami et al. | |
| 6,253,193 B1 | 6/2001 | Ginter et al. | |
| 6,272,556 B1 | 8/2001 | Gish | |
| 6,282,698 B1 | 8/2001 | Baker et al. | |
| 6,288,790 B1 | 9/2001 | Yellepeddy et al. | |
| 6,289,336 B1 | 9/2001 | Melton et al. | |
| 6,292,933 B1 | 9/2001 | Bahrs et al. | |
| 6,298,353 B1 | 10/2001 | Apte | |
| 6,304,871 B1 | 10/2001 | Gajda et al. | |
| 6,314,430 B1 | 11/2001 | Chang | |
| 6,317,738 B1 | 11/2001 | Lohman et al. | |
| 6,324,525 B1 | 11/2001 | Kramer et al. | |
| 6,324,619 B1 | 11/2001 | Raverdy et al. | |
| 6,332,161 B1 | 12/2001 | Sasson | |
| 6,353,820 B1 | 3/2002 | Edwards et al. | |
| 6,363,363 B1 | 3/2002 | Haller et al. | |
| 6,363,499 B1 | 3/2002 | Delo et al. | |
| 6,381,609 B1 | 4/2002 | Breitbart et al. | |
| 6,430,556 B1 | 8/2002 | Goldberg et al. | |
| 6,438,749 B1 | 8/2002 | Chamberlain | |
| 6,442,533 B1 | 8/2002 | Hinkle | |
| 6,442,748 B1 | 8/2002 | Bowman-Amuah | |
| 6,453,127 B2 | 9/2002 | Wood et al. | |
| 6,463,343 B1 | 10/2002 | Emens et al. | |
| 6,463,439 B1 | 10/2002 | Dahlberg | |
| 6,467,079 B1 | 10/2002 | Ettritch et al. | |
| 6,470,384 B1 | 10/2002 | O'Brian et al. | |
| 6,473,786 B1 | 10/2002 | Scouras et al. | |
| 6,477,580 B1 | 11/2002 | Bowman-Amuah | |
| 6,477,590 B1 | 11/2002 | Habusha et al. | |
| 6,480,860 B1 | 11/2002 | Monday | |
| 6,480,894 B1 | 11/2002 | Courts et al. | |
| 6,484,310 B1 | 11/2002 | Przybylski et al. | |
| 6,502,095 B2 | 12/2002 | Breitbart et al. | |
| 6,502,207 B1 | 12/2002 | Itoh et al. | |
| 6,505,238 B1 | 1/2003 | Tran | |
| 6,510,352 B1 | 1/2003 | Badavas et al. | |
| 6,518,983 B1 | 2/2003 | Grohmann et al. | |
| 6,526,571 B1 | 2/2003 | Aizikowitz et al. | |
| 6,539,337 B1 | 3/2003 | Provan et al. | |
| 6,546,419 B1 | 4/2003 | Humpleman et al. | |
| 6,553,428 B1 | 4/2003 | Ruehle et al. | |
| 6,557,039 B1 | 4/2003 | Leong et al. | |
| 6,571,282 B1 | 5/2003 | Bowman-Amuah | |
| 6,571,389 B1 | 5/2003 | Spyker et al. | |
| 6,578,068 B1 | 6/2003 | Bowman-Amuah | |
| 6,584,497 B1 | 6/2003 | Case et al. | |
| 6,590,587 B1 | 7/2003 | Wichelman et al. | |
| 6,615,258 B1 | 9/2003 | Barry et al. | |
| 6,643,679 B1 | 11/2003 | Erickson et al. | |
| 6,654,784 B1 | 11/2003 | Wei | |
| 6,657,625 B1 | 12/2003 | Chik et al. | |
| 6,675,228 B1 | 1/2004 | Bahrs et al. | |
| 6,725,231 B2 | 4/2004 | Hu et al. | |
| 6,826,759 B2 * | 11/2004 | Calder et al. | 719/328 |
| 6,928,488 B1 | 8/2005 | de Jong et al. | |
| 6,971,001 B1 * | 11/2005 | Rolfs | 713/1 |
| 7,016,919 B2 * | 3/2006 | Cotton et al. | 707/104.1 |
| 7,107,522 B1 * | 9/2006 | Morgan et al. | 715/201 |
| 2001/0020255 A1 | 9/2001 | Hofmann et al. | |
| 2001/0029604 A1 | 10/2001 | Dreyband et al. | |
| 2002/0010867 A1 | 1/2002 | Schaefer et al. | |
| 2002/0046239 A1 | 4/2002 | Stawikowski et al. | |
| 2002/0055804 A1 | 5/2002 | Betawar et al. | |
| 2002/0062475 A1 | 5/2002 | Iborra et al. | |
| 2002/0065814 A1 | 5/2002 | Okamoto et al. | |
| 2002/0069156 A1 | 6/2002 | Adam et al. | |
| 2002/0069192 A1 | 6/2002 | Aegerter | |
| 2002/0078115 A1 | 6/2002 | Poff et al. | |
| 2002/0103725 A1 | 8/2002 | Martin et al. | |
| 2002/0103835 A1 | 8/2002 | Kearney | |
| 2002/0109718 A1 | 8/2002 | Mansour et al. | |
| 2002/0111995 A1 | 8/2002 | Mansour et al. | |
| 2002/0111999 A1 | 8/2002 | Andersson | |
| 2002/0116205 A1 | 8/2002 | Ankireddipally et al. | |
| 2002/0120685 A1 | 8/2002 | Srivastava et al. | |
| 2002/0124113 A1 | 9/2002 | Gargya et al. | |
| 2002/0129096 A1 | 9/2002 | Mansour et al. | |
| 2002/0133579 A1 | 9/2002 | Bernhardt et al. | |
| 2002/0143721 A1 | 10/2002 | Charlet et al. | |
| 2002/0143819 A1 | 10/2002 | Han et al. | |
| 2002/0144101 A1 | 10/2002 | Wang et al. | |
| 2002/0147857 A1 | 10/2002 | Sanchez, II et al. | |
| 2002/0178191 A1 | 11/2002 | Sielken | |
| 2002/0178434 A1 | 11/2002 | Fox et al. | |
| 2002/0188765 A1 | 12/2002 | Fong et al. | |
| 2002/0188928 A1 | 12/2002 | Szpak et al. | |
| 2003/0009323 A1 | 1/2003 | Adeli | |
| 2003/0028555 A1 | 2/2003 | Young et al. | |
| 2003/0033121 A1 | 2/2003 | Chen et al. | |
| 2003/0033159 A1 | 2/2003 | Altomare | |
| 2003/0036809 A1 | 2/2003 | Landman et al. | |
| 2003/0046317 A1 | 3/2003 | Cseri et al. | |
| 2003/0050897 A1 | 3/2003 | Altomare | |
| 2003/0069907 A1 | 4/2003 | Moreau et al. | |
| 2003/0084067 A1 | 5/2003 | Obiaya | |
| 2003/0093574 A1 | 5/2003 | Fablet et al. | |
| 2003/0097383 A1 | 5/2003 | Smirnov et al. | |
| 2003/0160813 A1 | 8/2003 | Raju | |
| 2003/0163603 A1 * | 8/2003 | Fry et al. | 709/328 |
| 2003/0217033 A1 | 11/2003 | Sandler et al. | |
| 2004/0107183 A1 | 6/2004 | Mangan | |
| 2004/0230587 A1 | 11/2004 | Doddington | |
| 2005/0030555 A1 | 2/2005 | Phenix et al. | |

FOREIGN PATENT DOCUMENTS

| | | |
|---|---|---|
| WO | 01/63529 | 8/2001 |
| WO | 02/46916 | 6/2002 |
| WO | 02/46980 | 6/2002 |
| WO | 03/001373 | 1/2003 |

OTHER PUBLICATIONS

Rennhackkamp; One for the Road: Sybaseæs Adaptive Server Anywhere 6.0, M&T Publishing Inc., Section No. 10, vol. 11, p. 55, ISSN. 1041-5173.

McClanahan; Powerbuilder3.0, M&T Publishing Inc., vol. 6, No. 11, p. 57, ISSN. 1041-5173, Oct. 1993.

Unknown; Conjuring Up Com Through Scripting, p. 14, Jul. 2000.

Quantum SPC/DC Script File (.TDF) Definition Instruction Guide, ASI Data Myte Inc., Version 2.4, p. 2-14, Jan. 1, 2004.

Myers; Scripting Graphical Applications by Demonstration, Human Computer Interaction Institute, Carnegie Mellon University, www.cs.cmu.edu/bam, p. 1-8, Apr. 1998.

Ousterhoust; Scripting Higher Level Programming for the 21st Century, Sun Microsystems Laboratories, Draft #2, p. 1-14, May 10, 1997.

Dolev, et al.; An Integrated Architecture for the Scalable Delivery of Semi-Dynamic Web Content, Proceedings of the Seventh International Symposium on Computers and Communications, IEEE, 2002.

BETWIXT: Turning Beans Into XML, Apache Software Foundation, Archived Jun. 20, 2002 at <http://web.archive.org/web/20020620000410/http://jakarta.apahce.org.commons/BETWIXT/>, p. 1 of 1, Nov. 13, 2005.

XML Schema Part 0 Primer-W3C Working Draft, W3C, Feb. 2000, Retrieved From the Internet on Nov. 18, 2005 at <http://www.w3.org/TR/2000/WD-XMLSCHEMA-0-20000225/>, 42 Pages.

Frank M. Carrano, et al.; Frank M. Carrano, et al., Data Abstraction and Problem Solving With C++, Aug. 1998, Addison-Wesley, Chapter 2.

Brodkin; Brodkin, Use XML Data Binding to Do Your Laundry, Retrieved From the Internet on May 19, 2006, Acessed and Printed From From the Internet on May 19, 2006 at http://www.javaworld.com/javaworld/JW-12-2001/JW-1228-JAXB.html.

Thomas; Enterprise Javabeans(TM) Technology: Server Component Model for the Java(TM) Platform, java.sun.com, May 21, 1999.

Rennhackkamp; One for the Road: Sybaseæs Adaptive Server Anywhere 6.0, M&T Publishing Inc., Section No. 10, vol. 11, p. 55, ISSN. 1041-5173; Sep. 1998.

White; Quantum SPC/DC Script File (.TDF) Definition Instruction Guide, ASI Data Myte Inc., Version 2.4, p. 2-14, Jan. 1, 2004.

Dolev, et al.; An Integrated Architecture for the Scalable Delivery of Semi-Dynamic Web Content, Proceedings of the Seventh International Symposium on Computers and Communications (ISCC'02), 2001.

Frank M. Carrano, et al., Data Abstraction and Problem Solving With C++, Aug. 1998, Addison-Wesley, Chapter 2.

Brodkin; Use XML Data Binding to Do Your Laundry, Retrieved From the Internet on May 19, 2006.

OS/2EE Database Manager SQLJRA Remote Protocol, www.spl.org; p. 1-5, Jan. 1993.

Code Generation for Database Applications; www.spi.org; p. 1-3; Mar. 1992.

* cited by examiner

SYSTEM AND METHOD FOR COMMUNICATING BETWEEN AN APPLICATION AND A DATABASE

CROSS-REFERENCE TO RELATED APPLICATION

This is a continuation application of U.S. patent application Ser. No. 10/308,792, filed Dec. 3, 2002, entitled "Method For Simplifying Databinding In Application Programs". The U.S. patent application Ser. No. 10/308,792 is incorporated herein by reference.

FIELD OF THE INVENTION

This invention relates to a method for the exchange of data between an application program and a database using a framework, and in particular to a method, using a databinding framework, that automatically generates computer code for reducing the number of lines of application code that need to be written by the developer for database operations. The method is particularly useful with complex business and financial application programs.

BACKGROUND OF THE INVENTION

Computer programs (applications) can be very complex. Such applications might perform calculations needed for financial transactions. For example, financial applications can facilitate the buying or selling of business or financial instruments such as derivatives. The complexity involves the number and type of calculations performed by the application, the large volume of data on which the application bases those calculations and the computed data representing the results of the application's computations. Software developers generally write these applications in a high level computer programming language. Object Oriented languages, such as Sun Microsystems® Java (JAVA) and its various versions as Sun Microsystems® J2EE (J2EE the "enterprise edition") are particularly well suited for very large complex applications.

The data that represents the inputs and outputs of the application can be voluminous. And, in large companies and financial institutions, it is likely that the data is shared by several applications. In such large and complex systems, the data representing all of the information needed by the application (inputs) and processed information (outputs) is generally stored on one or more databases that are semiautonomous of the application, i.e. the application does not directly read and write information to the databases. It communicates with the database through a database management program. Sybase, Inc.® Sybase (SYBASE), Microsoft® SQL Server (SQL SERVER) and Oracle Corporation® Oracle (ORACLE) are exemplary of such commercial database products.

One aspect of database programs is that the data is stored, read, and written in the form of tables. Database data is typically grouped in tables by similar characteristics, and the database program maintains the relationships between the tables. For example, the characteristics of a particular financial instrument might be found in one table while it's trading history can be found in another table. These tables can be then be related by the identifier of the instrument. Table based database systems are known as relational databases. Relational database programs are optimized for searching, for reporting selected data from the database, and for writing data to selected data tables.

Communication with commercial databases is typically done via a structured query language (SQL). SQL lines can use variable input parameters, such as the name of a financial instrument, or a date, or range of dates. Many lines of SQL code may be required for a given database operation. Stored procedures are lists of SQL code that allow for input parameters and generate tabular result sets. The stored procedures are generally stored in the database.

By contrast, applications are usually written in high level object oriented languages. Object oriented languages such as J2EE offer very powerful and computationally efficient computing environments for solving business calculations. (The calculations are typically presented to the application developer as a set of rules known as the business model). Object Oriented languages are designed to work with objects. Objects are programming structures of the application that contain both functions and the corresponding data for a given computational task. They are generally focused on solving a particular problem.

An application runs on one or more computers. During "runtime" it typically reads and writes large volumes of information in the form of data. After a particular run, the program needs to save a great deal of information so that the next time it runs, it continues one or more calculations from the previous ending state. Also, some data within objects simply needs to be saved in the database. Persistence refers to the ability of the application to save various conditions of the application and data at the end of a run so that it is available to the application at the beginning of the next run.

Object oriented languages are becoming ever more rich in their ability to interact with other systems and programs such as commercial database programs. They do this by offering a suite of libraries that provide pre-written application programming interfaces (API) for application developers. For example J2EE offers tools to communicate with database programs such as SYBASE. Even with these tools, the Java programmer still must write many lines of JAVA code and then many lines of SQL code (stored procedures) to perform a given database operation. Depending on the complexity of the interaction, it can literally take weeks for a programmer to write all of the needed code for an interaction between the application and the database, as between JAVA and SYBASE. And, because the stored procedures can comprise many lines of very detailed SQL code, there is a very good chance for coding errors. Proof reading such code is difficult and time consuming.

Because the application handles information as part of its objects, and the database handles information as tables, the data structures must be converted for the two programs to communicate with each other. One approach is to provide a system that maps tabular data to objects in a way that is transparent to the programmer writing the application. This system of binding tabular data to objects is called databinding. In databinding, objects can be written that deal only with the information to be exchanged. Similarly, stored procedures can be written to only carry out the corresponding database interactions. The stored procedures are "lightweight" in the sense that they do not perform any business calculations. A method, or framework, to manage data for an application is ideally "encapsulated". That is, it is isolated from the application's business calculations (the business model).

What is needed is a method that implements a lightweight stored procedure framework whereby the applications programmer solving a business model need only specify a few simple lines of code to communicate with the tabular data in a relational database.

SUMMARY OF THE INVENTION

A method for communicating between an application and a database by using a lightweight stored procedure databinding framework for applications written in object oriented programming languages such as JAVA. The method significantly reduces the coding effort required to communicate with a relational database. Once the developer specifies the needed tabular data, the inventive framework generates all needed data objects and stored procedures to accomplish the interaction with that database data. The automatically generated code is then used by the application via a run-time component. This means the developer need only make simple calls in a few lines of code for database interaction.

The encapsulated data model deals only with persistence and retrieval issues and is therefore de-coupled from the business model. The developer can therefore concentrate on implementing a complex business object model. And, changes to the business object models have no direct impact on the underlying persistence model. The encapsulated method provides a generic configurable means of persisting and retrieving objects to and from a relational database. While it is described in a JAVA-SYBASE environment embodiment, the method is applicable to other object oriented languages and database programs.

Automatic code generation reduces a developer's coding time by up to 90%. Moreover, coding errors are virtually eliminated since the generated code is not prone to manual coding errors. Thus, testing time is reduced as well.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that the drawings are for the purpose of illustrating the concepts of the invention, and except for the graphs, are not to scale. It is also understood that all application code, other framework code, the database program, and data reside on tangible computer readable media and run on one or more computer systems.

DESCRIPTION

The application is divided into two parts. Part I discusses the invention as a general framework solution for object oriented applications that access data from database programs using a structured query language (SQL) and groups of SQL calls as stored procedures. Part II of the application, for those skilled in the art, is an example of the inventive framework for the JAVA, J2EE and SYBASE programming environments.

Part I: A Lightweight Stored Procedure Data-Binding Framework for Business and Financial Applications The inventive framework comprises two distinct components. A code generator is used during program development to automatically generate required stored procedures, JAVA code, and an XML data exchange and documentation middle layer. A second component, the run-time component integrates the generated code into the running business application as library routines so that the business program can retrieve, store, and persist data with very minimal JAVA code, usually with only one or two lines of JAVA code.

Figure 1:
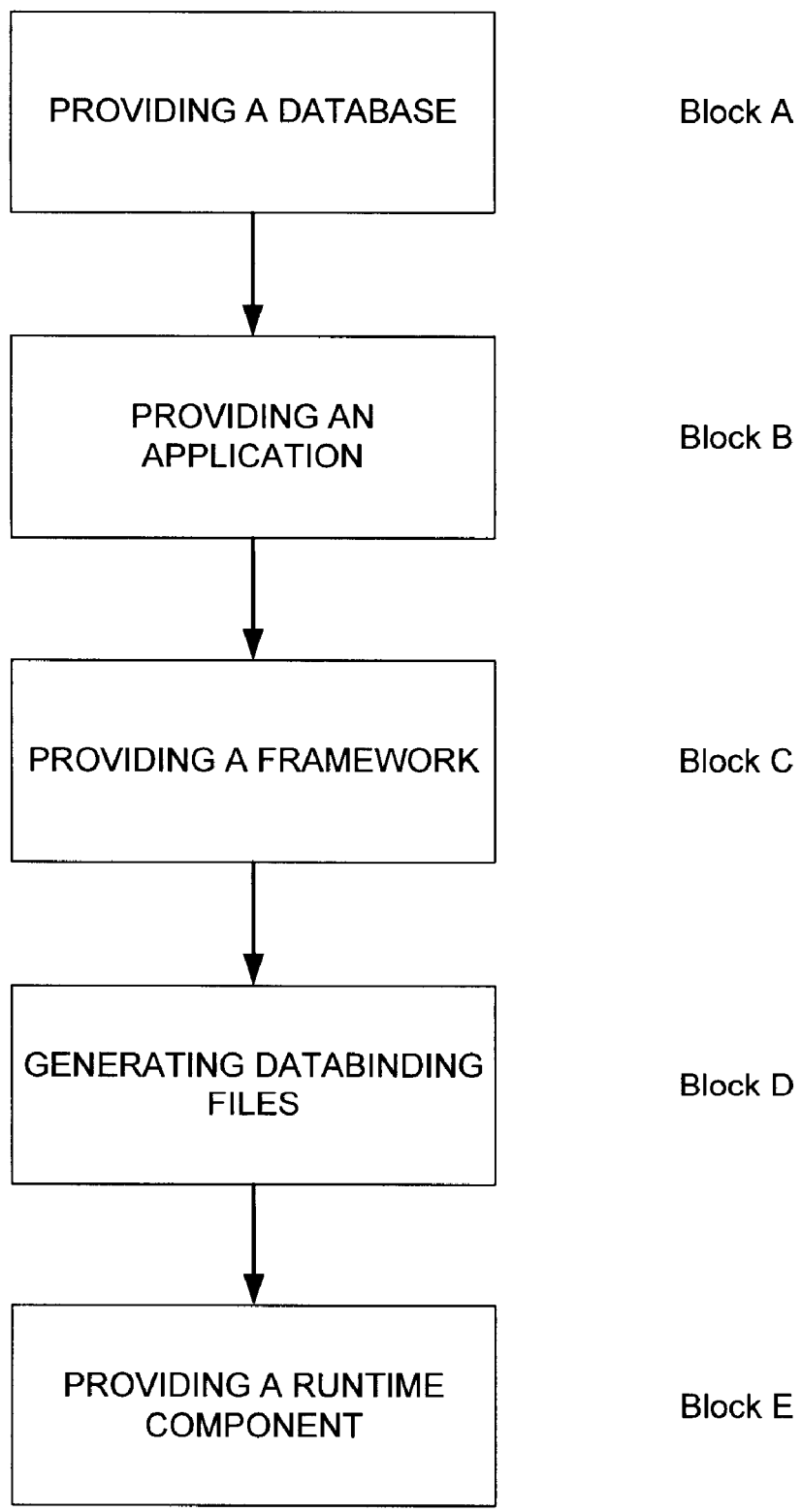
FIG. 1 is a simplified block diagram showing the databinding framework.

The method of databinding database relational tables to application objects shown in FIG. 1. In Block A, the application is provided and in Block B, the database. The framework discussed in Parts I and II is provided in Block C. Using the method, first databinding files are generated in Block D, and finally those databinding files are integrated into the application at run-time by the run-time component of the framework provided in Block E.

Figure 2:
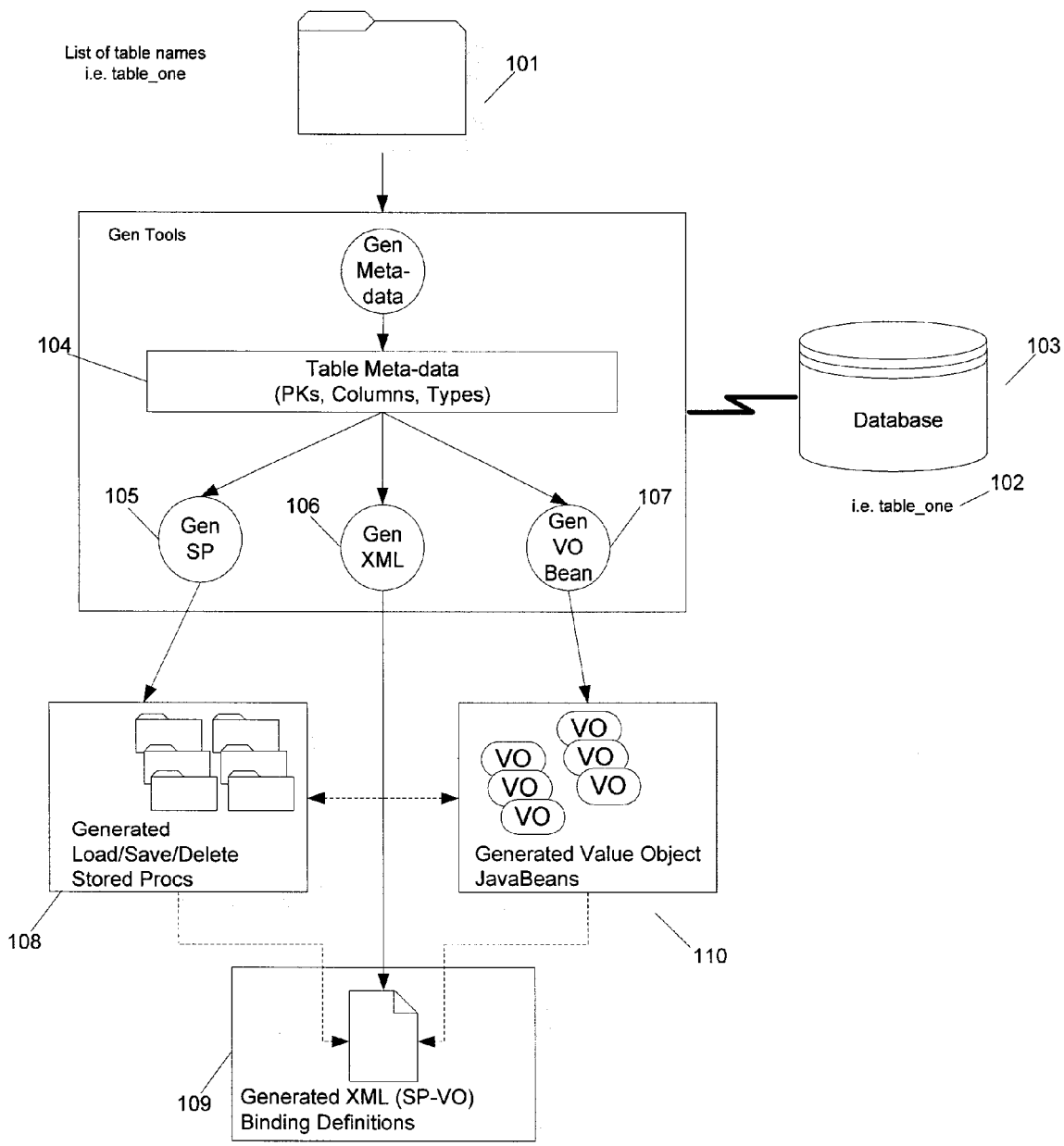
FIG. 2 is a simplified block diagram of the framework's generator component.

The Code Generator of the Framework:

The code generator is shown in FIG. 2. The developer supplies a list 101 of needed data specified as database table names. By way of example, the developer here is interacting with table "table_one" 102. The data (information) corresponding to table_one resides in relational database 103. The generating tool initially parses the required tabular data and generates table meta-data 104 in the form of database 102 primary keys, columns, and data types.

Based on meta-data 104, the code generator creates three types of output files, all of which are used later during the running of the business or financial application (hereinafter "application") via the framework's run-time component. The generated stored procedures 105 are the part of the framework that communicate most directly with the relational database.

The generated XML files 106 create a "middle layer" of the framework. They are written in the extensible Markup Language (XML). These files act as the "glue" by defining what each stored procedure is called, and what its input and output parameters are. At run-time, the XML documents (configuration files) reside between the stored procedures that directly access database 102 and the JAVA code of the application. The XML documents can be read directly as text documents. Because XML documents are structured and nested, they are also self-explanatory and self-documenting.

The code generator also writes value objects 107. The value objects, generated "beans" in JAVA, are part of an object class for exchanging data with the database. They provide the final links that ultimately map the tables of relational database 102 to the application written in an object oriented language such as JAVA. Following the philosophy of frameworks created in object oriented programming environments, the value objects perform only functions related to information exchange between database 102 and the application. No business rules are calculated in these objects. Business rules can be computed solely by the application.

Blocks 108 to 110 further illustrate the roles of the each of the three generated sections of code. Block 108 shows the generated stored procedures 105. The stored procedures 105 of block 108 communicate via the generated XML configuration files of XML code 106, as shown by block 109, with the application. The generated value objects 107, for example Sun Microsystems® Java Beans (JAVA BEANS), complete the databinding by providing the final mapped data in a form suitable for use in the run-time object oriented environment of the application, as shown by block 110. Thus the stored procedures of block 108 are "connected" to the value objects of block 110 by the generated XML middle layer 109.

Figure 3:
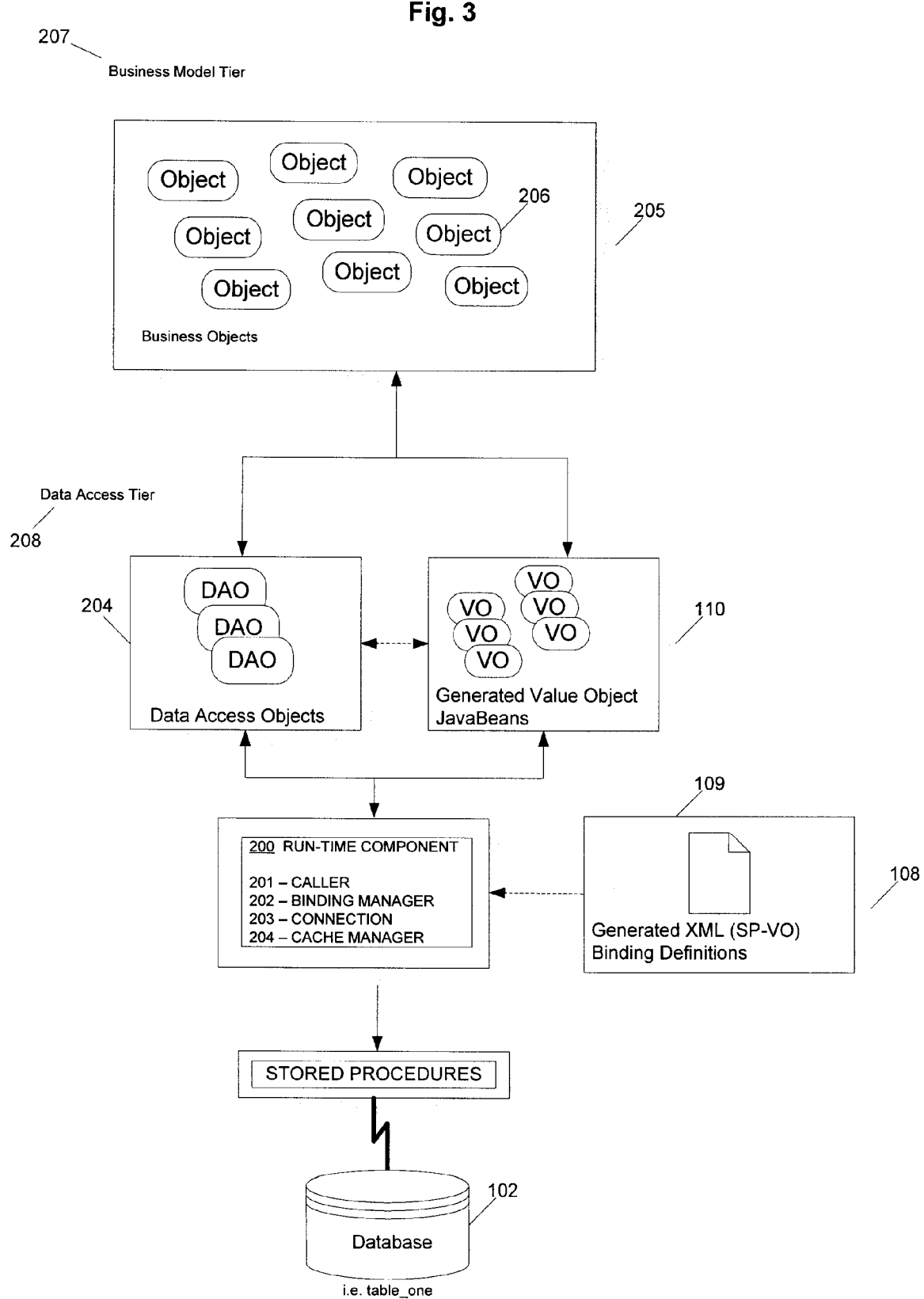
FIG. 3 is a simplified block of the framework's run-time components.

The Run-Time Component of the Framework:

FIG. 3 shows the run-time component 200 of the framework. It illustrates the method by which the code generated by the code generation component is used during the running (run-time) of application. Computations of business rules 205 are done as part of objects 206 in the Business Model Tier 207. Information (data) exchange is done in Data Access Tier 208.

Data Access Tier 208 comprises the code generated by the code generator. Run-time component 200 integrates the generated code into the application. The generated stored procedures 108, generated XML middle layer 109, and generated value objects 110 are tied together by run-time component 200. Data Access Objects (DAOs) 204 are the simplified lines of code (calls) from the objected oriented application. DAOs 204 are hand written into the application by the developer.

Run-time component 200 comprises subcomponents 201-204. Caller 201 provides interaction to the database via a unique identifier for each XML binding document. Connection manager 202 provides for physical connections to the database. Binder Manager 203 maps the stored procedures to the value objects during application startup. And, Cache Manager 204 can cache store procedure results as list of value objects in memory for a time for quicker application access.

Using the inventive framework, the developer starts with an existing relational data model. Then the tables that will be used to persist the application's data are identified. A table of metadata is generated from the list of table names by the code generator from which the code generator creates the Load, Save, Delete, LoadList Stored Procedures, the Value Objects (i.e. JAVABEANS) and, XML binding definitions. Finally, the developer writes the Data Access Objects business model interface by-hand in just a few lines of application code.

The benefits of the inventive framework are manifold. It generates both application code and stored procedures. In the best practices of object oriented programming, the stored procedures and value objects contain no business logic. And, the business model is de-coupled from the underlying persistence model. There is simplified data access interface i.e. load, loadList, save, delete. In the case of a JAVA solution, it wraps the clunky JAVA DataBase Connectivity (JDBC) Stored Procedure interface. And, a very important feature is that the framework significantly reduces error-prone, mundane data access, stored procedure development. Thus, the development effort gains more time to focus on the business model code because the data access build effort and cost are now 10% of what they would have been without the inventive framework. Also, stored procedure logging can be easily implemented in this framework. And finally, run-time can be improved by built-in memory caching.

Furthermore, since routing human coding errors are virtually eliminated there is far less required data access testing. As will be shown in the example, the framework is easily integrated into standalone JAVA applications or J2EE enterprise applications.

While the inventive framework can be adapted to all known business class object oriented languages and commercial database systems, the embodiment of the example was coded using JAVA (JAVA BEAN, JDBC, Reflection), XML, XML schema, Castor, SYBASE database, Apache Commons, and Apache Log4J.

Part II:

An Example Framework in JAVA and SYBASE with an XML Middle Layer

The embodiment described here is called SPBinder. SPBinder is a lightweight Stored Procedure data-binding framework for JAVA. Its main function is to significantly reduce the coding effort required to call database Stored Procedures by encapsulating the clunky JAVA DataBase Connectivity (JDBC) interface and providing a generic configurable means of persisting/retrieving JAVA objects to/from a relational database. The main advantage of encapsulating the data model is that it purely deals with persistence and retrieval and therefore becomes de-coupled from the business model. This means the developer can concentrate on implementing a complex business object model without directly impacting the underlying persistence model. The SPBinder framework has two main components—a code generation component for developers called GenUtils and run-time component called SPBinder.

GenUtils

The GenUtils component is set of code generation utilities that take a list of database table names (new or legacy) as input and extracts the table metadata directly from a database where the tables are defined to generate associated, JAVA BEANS (Value Objects), stored procedures (loadList, load, save and delete), and XML data-binding definition documents.

The XML data-binding document (see Appendix for schema) describes the relationship between stored procedure input/output parameters, result sets and associated JAVA BEANS (Value Objects). This means that at run-time, Stored Procedure input parameters can be mapped directly from JAVA Object attributes, and stored procedure result sets can be mapped to a list of JAVA Objects.

Example of XML data-binding definition document:

```
<?xml version="1.0" encoding="UTF-8"?>
<!-- edited with XML Spy v4.0.1 U (http://www.xmlspy.com) by John Mangan (JPMorganChase) -->
<!--Sample XML file generated by XML Spy v4.0.1 U (http://www.xmlspy.com)-->
<StoredProcBinder>
    <StoredProcs jdbcConnectionResource="com.jpmorgan.eqeis.spbinder.database.test.jdbc_conn">
        <StoredProc name="sp_who" id="Who">
            <InputParams>
                <Param column="@loginname" property="name" javaType="java.lang.String"/>
            </InputParams>
            <ResultSetParams model="com.jpmorgan.eqeis.spbinder.database.test.IdObject">
                <Param column="spid" property="id"/>
                <Param column="loginname" property="name"/>
            </ResultSetParams>
        </StoredProc>
</StoredProcBinder>
```

SPBinder

SPBinder is the run-time component, which uses the XML binding document and JAVABEAN (Value Objects) and encapsulates communication to the database via JDBC. It consists of four main components, SPBinderManager, SPConnection, SPCaller and SPCacheManager.

SPBinderManager

SPBinderManager normally reads in the XML binding document once during application start-up and builds a data-binding mapping in memory using the unique identifier to reference each Stored Procedure and associated data-binding JAVABEAN (Value Object). This unique identifier can then be used by SPCaller to do the actual database access.

example:

```
static SPBinderManager spBM = SPBinderManager.getInstance( );
spBM.loadXMLConfigResource("com/jpmorgan/eqeis/spbinder/database/test/SPBindings.xml");
```

SPConnection

The SPConnection component handles the physical database connections and associated transaction management. It can also handle connection pooling in a J2EE environment.

SPCaller

SPCaller uses the unique identifier defined in the XML binding document to access the database and load, save or delete data. The data is automatically extracted from or populated in the JAVABEAN (Value Objects) where appropriate. Using the XML definition above, the example below shows how to load a list of users and their spids (SYBASE process Id's): example:

```
try {
    SPCaller spCaller = new SPCaller( );
    List list = spCaller.loadList("Who", null);   // execute sp_who and returns a list of spids & names
    Iterator iter = list.iterator( );
    while (iter.hasNext( )) {
        IdObject idObj = (IdObject) iter.next( );
        System.out.println("Spid:" + idObj.getId( ) + " Name: " +
        idObj.getName( ));
    }
}
catch (SPBinderException e) {
    System.error.println(e.getMessage( ));
}
```

The SPCaller component has built-in logging, which can be used to trace Stored Procedure calls, input parameters and result sets.

SPCacheManager

SPCacheManager is a component, which manages a read-only time-expiry cache of list based data. This can be used to cache Stored Procedure result sets as lists of JAVABEAN (Value Beans) in memory for a period of time. The time to expire variable can be configured per Stored Procedure in the XML data-binding document.

APPENDIX
StoredProcBinder.xsd

```xml
<?xml version="1.0" encoding="UTF-8"?>
<!-- edited with XML Spy v4.0.1 U (http://www.xmlspy.com) by John Mangan (JPMorganChase) -->
<!--W3C Schema generated by XML Spy v3.5 NT (http://www.xmlspy.com)-->
<xs:schema   xmlns:xs="http://www.w3.org/2001/XMLSchema"   elementFormDefault="qualified" attributeFormDefault="unqualified">
    <xs:annotation>
        <xs:documentation>SPBinder (Stored Proc to JavaBean databinding definition)   Castor generation - com.jpmorgan.eqeis.spbinder.database.xml</xs:documentation>
    </xs:annotation>
    <xs:element name="StoredProcBinder">
        <xs:complexType>
            <xs:sequence>
                <xs:element ref="StoredProcs" minOccurs="0"/>
            </xs:sequence>
        </xs:complexType>
    </xs:element>
    <xs:element name="StoredProcs">
        <xs:complexType>
            <xs:sequence>
                <xs:element ref="StoredProc" minOccurs="0" maxOccurs="unbounded"/>
            </xs:sequence>
            <xs:attribute name="jdbcConnectionResource" type="xs:string" use="required"/>
        </xs:complexType>
    </xs:element>
```

-continued

APPENDIX
StoredProcBinder.xsd

```
<xs:element name="StoredProc">
    <xs:complexType>
        <xs:sequence>
            <xs:element name="InputParams" type="Params" minOccurs="0"/>
            <xs:element name="ResultSetParams" type="Params" minOccurs="0"/>
        </xs:sequence>
        <xs:attribute name="name" type="xs:string" use="required"/>
        <xs:attribute name="id" type="xs:string" use="optional"/>
        <xs:attribute name="jdbcConnectionResource" type="xs:string" use="optional"/>
        <xs:attribute name="cacheable" type="xs:boolean" use="optional"/>
        <xs:attribute name="cachetimeout" type="xs:integer" use="optional"/>
    </xs:complexType>
</xs:element>
<xs:complexType name="Params">
    <xs:sequence>
        <xs:element ref="Param" minOccurs="0" maxOccurs="unbounded"/>
    </xs:sequence>
    <xs:attribute name="model" type="xs:string" use="optional"/>
</xs:complexType>
<xs:element name="Param">
    <xs:complexType>
        <xs:attribute name="column" type="xs:string" use="required"/>
        <xs:attribute name="property" type="xs:string" use="required"/>
        <xs:attribute name="output" type="xs:boolean" use="optional"/>
        <xs:attribute name="value" type="xs:string" use="optional"/>
        <xs:attribute name="javaType" type="xs:string" use="optional"/>
    </xs:complexType>
</xs:element>
</xs:schema>
```

We claim:

1. A computer readable medium having stored thereon a plurality of instructions, the plurality of instructions including instructions which, when executed by a computer, cause the computer to perform steps of a method for enabling a databinding framework for communicating between an application and a database, said method comprising the steps of:
generating a code of databinding files to bind data of the database to a program of the application wherein said code identifies tables to persist the data in the database, wherein said code generates a table of metadata from the identified tables, wherein said code generates stored procedures from the metadata table, generates value objects (VO) from the metadata table and generates at least one XML binding definition from the metadata table; and
integrating the generated code of the stored procedures to the VOs via the XML binding definitions into the application when the application is run.

2. The computer readable medium of claim 1 further comprising generating a second code of Data Access Objects (DAOs).

3. The computer readable medium of claim 2 wherein said run-time component integrates the DAOs into the application when the application is run.

4. The computer readable medium of claim 1 wherein said database include relational database and application program Written in an object oriented language.

5. The computer readable medium of claim 1 wherein said integrating comprising mapping the stored procedures to the VOs using the XML binding functions.

6. A computer-implemented system for communicating between an application and a database, the system comprising:
a code generator to generate a code of databinding files to bind data of the database to a program of the application wherein said code identifies tables to persist the data in the database, wherein said code generates a table of metadata from the identified tables,
wherein said code generates stored procedures from the metadata table, generates value objects (VO) from the metadata table and generates at least one XML binding definition from the metadata table; and
at least one run-time component coupled to the code generator to integrate the generated code of the stored procedures to the VOs via the XML binding definitions into the application when the application is run.

7. The system of claim 6 wherein said run-time component functions to integrate a second code of Data Access Objects (DAO) from the metadata into the application when the application is run.

8. The system of claim 6 wherein said data is in a tabular format.

9. The system of claim 6 wherein the database comprises a relational database.

10. The system of claim 6 wherein the database comprises a relational SYBASE database.

11. The system of claim 6 wherein the database comprises a relational SQL SERVER database.

12. The system of claim 6 wherein the database comprises a relational ORACLE database.

13. The system of claim 6 wherein the application comprises an application written in an object oriented language.

14. The system of claim 6 wherein the application comprises an application written in JAVA programming language.

15. The system of claim 6 wherein the application comprises an application written in C++ programming language.

16. The system of claim 6 wherein the run-time component comprises subcomponents of SPBinder Manager, SPConnection, SPCaller, and SPCacheManager.

17. The system of claim 6 wherein said run-time component further comprising a binding manager for mapping the stored procedures to the VOs using the XML binding functions.

* * * * *